Aug. 13, 1935.  E. L. RAGONNET  2,011,347
VEHICULAR GAS CYLINDER APPARATUS
Filed June 16, 1933   3 Sheets-Sheet 1
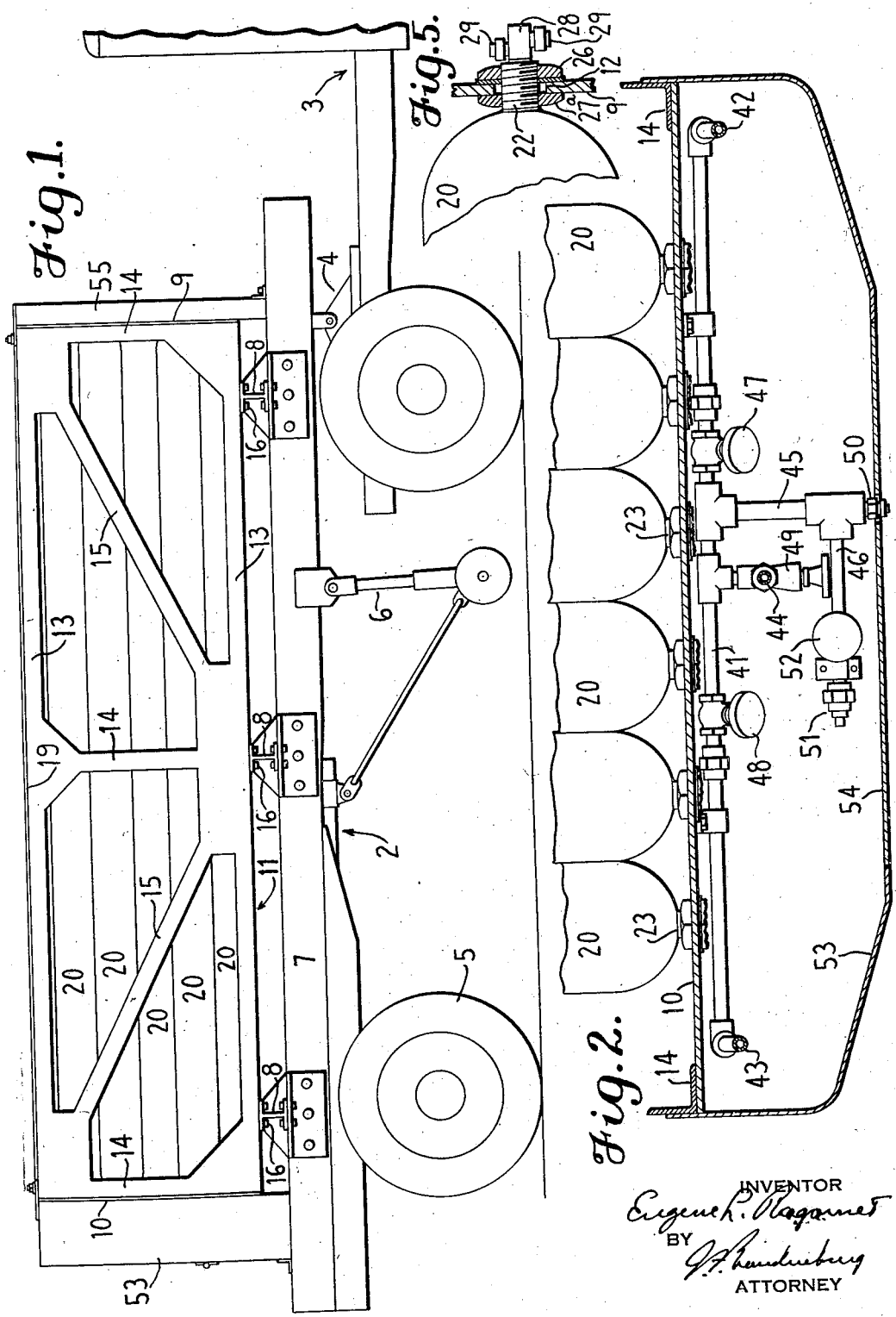
INVENTOR
Eugene L. Ragonnet
BY
ATTORNEY

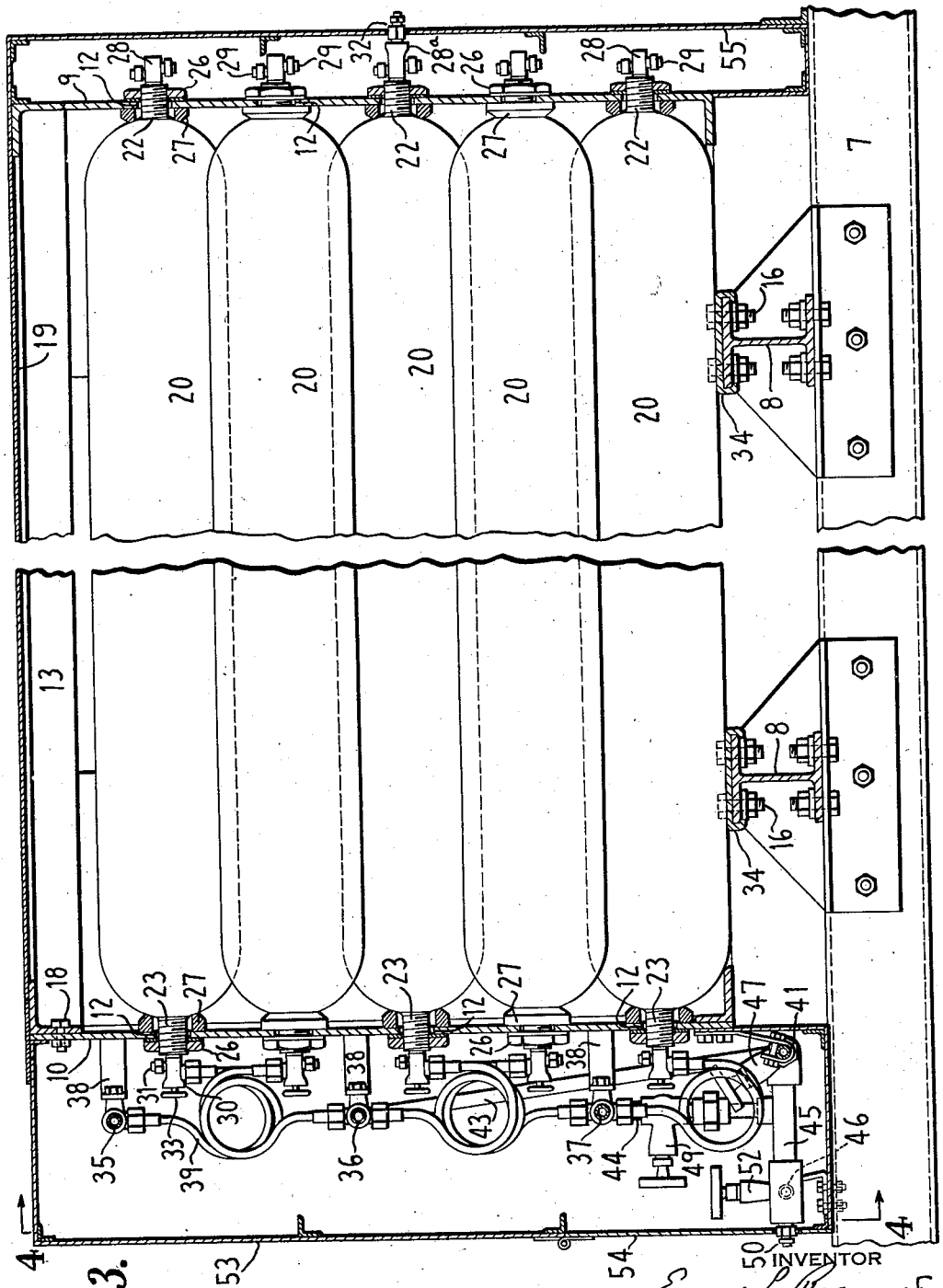

UNITED STATES PATENT OFFICE 2,011,347

VEHICULAR GAS CYLINDER APPARATUS

Eugène L. Ragonnet, New York, N. Y., assignor to Air Reduction Company, Incorporated, New York, N. Y., a corporation of New York Application June 16, 1933, Serial No. 676,146

9 Claims. (Cl. 221—73.5)

This invention relates to a novel gas cylinder battery carried by a vehicle, for use in making deliveries of compressed gas to places of consumption, in there supplying gas to the consumption system, and in returning the cylinder battery to a gas plant for re-charging.

The invention has a particular utility in the transportation and use of compressed oxygen for industrial purposes, but it is also applicable to the distribution of other gases which are consumed on a large scale.

The practice has been to load ordinary gas storage cylinders or bottles on a truck or freight car for making deliveries from the gas plant to the consumer's plant, and for returning empty cylinders to the gas plant. Under this practice, the cylinders are handled individually at both plants, at very considerable trouble and expense, and a very large number of cylinders, representing a heavy capital investment, are required. It has been proposed to secure ordinary oxygen bottle cylinders in vertical positions, and separated from each other, on a freight car or truck, with the cylinders manifolded, so that the wheeled vehicle with its load might serve as a transportable storage and service unit, but the complication and cost of such a plan would be excessive as compared with that of the present invention.

The object of this invention is to effect substantial economies by providing a vehicular battery of gas cylinders of large capacity, which are in permanent assemblage and so disposed and retained on the vehicle that a very large gas-carrying capacity is obtained. The invention is particularly applicable to transportation of gas by motor truck, and more especially by truck trailers or semi-trailers. It is an object of the invention not only to utilize the available space effectively, but also to provide an assemblage so constituted that, of the load that the vehicle can carry and that the motive power must haul, as large a part as possible may be the commodity, namely gas, while the part of the load represented by the metal of the cylinders, the manifolds, manifold connections, etc., and the means for securing the cylinders, is kept as moderate as possible. To meet the side sway problem, a comparatively low center of gravity of load is also sought.

An important object is safety in the transportation of the cylinder battery. Still other objects are to make possible a simple and readily accessible manifolding system, to avoid complication and excessive weight and expense in this part of the apparatus, to minimize the problem of keeping manifold joints and connections tight, to reduce the possibilities of loss of gas by leakage, to avoid complication in respect to means for holding the cylinders, and generally to provide a simple and serviceable unit for the purposes stated.

These and other objects and advantages are realized by a construction in which the battery is composed of long gas cylinders disposed lengthwise of the vehicle, and these cylinders are associated and held in solid mass.

This disposition of the cylinders of the battery has the special advantage that the means for holding the cylinders may be light, since the weight of the cylinders themselves is made a substantial factor in keeping them in place when the vehicle stops quickly or starts quickly, or the motion is accelerated or decelerated. The friction between the cylinders of the bottom layer and the underlying support and the friction between the cylinders of the superincumbent layers restrains in a very large measure any tendency of the cylinders to move endwise or to act as projectiles if the truck comes to an abrupt stop. In the range of conditions of ordinary road travel, the friction is friction at rest as distinguished from friction of motion. The walls of the cylinders preferably contact directly with each other, as illustrated, but manifestly the principle of mutual vertical support and the application of the total weight of the cylinder battery directly to the underlying frame is not departed from if wear or cushion elements be interposed.

In the preferred embodiment of the invention, vertical transverse retainers are disposed at the front end and at the rear end of the battery of cylinders, these retainers being secured and braced to the truck or trailer frame, or to a structure securely applied to that frame. The cylinders are provided at both ends with necks, which pass through openings in the retainers, so that nuts or other securing devices applied to these necks and tightened against the retainers suffice to keep the cylinders in place, individually and collectively. A particularly light and simple construction, having all the strength required of it, is one in which these end retainers consist of flat plates perforated for the cylinder necks. These openings or perforations are intentionally made considerably larger than the necks, in order that the weight of the cylinders need not be carried by the retaining or holding means, and consequently a heavy retaining structure is not required. The coaction of the retainers and the securing nuts or the like, supplemented by the friction between the cylinders and between them and the under frame, holds the cylinders firmly against endwise displacement. The same means are also sufficient to hold the cylinders against displacement sideways or upward, or against turning about their axes. Experience in conveying these batteries over roadways of various kinds has demonstrated that the cylinders do not leave contact and come together again as the result of shocks. The solidity of the assemblage is important not only because it obviates wear on the cylinders and the retaining means and eliminates objectionable noise, but also because the least strain is placed upon the manifolds and their connections hereinafter described.

Other objects, features and advantages of the invention will be apparent to those skilled in the art from the specification and drawings.

In the said drawings, which form a part hereof:

Fig. 1 is a side elevation of the preferred embodiment of the invention applied to a semi-trailer, a portion of a motor truck or tractor being shown connected to the trailer;

Fig. 2 is a fragmentary view on a larger scale, the view showing the rear portion of the apparatus in horizontal section taken approximately on the line 2—2 of Fig. 4, the cylinders, however, being shown in plan;

Fig. 3 is a vertical longitudinal section taken on the line 3—3 of Fig. 4, a portion of the portable unit intermediate its ends being broken out and the running gear being omitted for lack of space, and the cylinders being shown in elevation;

Fig. 5 is an enlarged detail sectional view showing another manner of securing the cylinders to the end plate.

Figure 4:
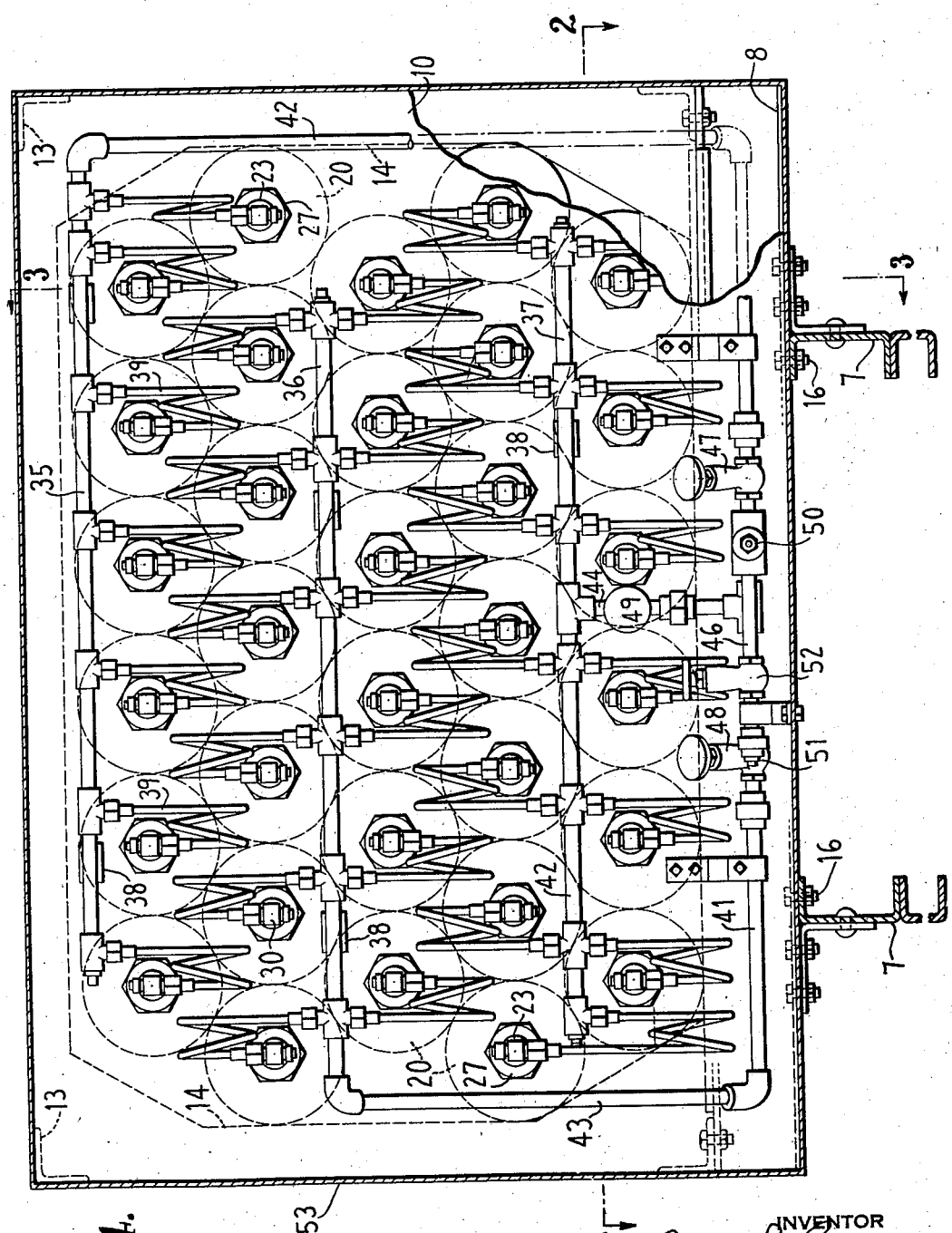
Fig. 4 is a rear end elevation and vertical section taken on the line 4—4 of Fig. 3.

The form of the invention shown in Figs. 1–5 will now be described.

The vehicle that carries the portable gas cylinder battery is preferably a semi-trailer 2, drawn by a motor truck tractor 3, to which it is connected and from which it can be disconnected, in a familiar manner, at 4. While traveling, such a trailer is supported at the front by the truck and at the rear by its own wheels 5. Customary means 6 can be lowered to give the trailer stable support when the portable gas storage battery is kept at a consumer's plant or at the charging plant.

The frame of the vehicle 2 comprises longitudinal sills 7, to which cross-beams 8 are fastened. Toward the front and rear of the vehicle frame there are vertical, transverse end retainers 9 and 10, which are firmly supported from the wheeled frame and appropriately braced. Each of these retainers preferably consists of a plate pierced with holes 12, these holes being in horizontal rows with the holes of each row staggered midway with respect to the holes of adjacent rows. In this particular embodiment of the invention there are five rows of holes across each end retainer plate.

The manner of supporting and holding the end plates 9 and 10 may be varied. In the construction shown a skeleton box frame 11 is welded up of pieces to form longitudinal members 13, vertical members 14, diagonal members 15 and suitable cross members. This box frame is bolted at 16 to the cross-beams 8, and the end retainer plates 9 and 10 are secured to the ends of the box frame, the front plate 9 being preferably incorporated with the box frame by welding, while the rear plate 10 is fixed to said frame by bolts 18. A roof 19 is applied to the top of the box frame to protect the gas cylinders from the sun's heat.

The nest of compressed gas cylinders 20 occupies the space between the retainer plates 9, 10. In an actual embodiment, special cylinders 16 ft. in length, excluding the necks, and 8½ in. internal diameter, have been employed, each capable of holding 1180 cu. ft. of oxygen (measured as free gas) under 2400 lbs. pressure, and weighing 623 lbs. when full. Equal or greater capacity can be secured, with less height, by employing cylinders 20 ft. or more in length.

Each cylinder has an axially projecting neck 22 at the front end, and a similar neck 23 at the rear end, these necks being externally screw-threaded as shown. The necks project through the openings 12 in the plates 9 and 10, respectively, and these openings are made considerably larger than the necks, so that the necks do not touch the edges of the holes, or, at least, are not supported against gravity by the end plates. A nut 26 is screwed onto each neck 22 or 23 against the outside of the plate 9 or 10, while a collar 27 bears against the inner surface of the plate and against the end of the cylinder. Instead of the collars 27, nuts 27ᵃ may be screwed on the inner portions of the neck, to bear against the inner sides of the plates, as shown in Fig. 5. There is considerable advantage in the use of spacing or thrust collars 27 over the use of the inside nuts 27ᵃ, since the collars 27 do not impose stress on the necks but apply thrust to the shoulders of the cylinders. The retainer plates 9 and 10 afford a degree of elasticity or flexibility at the time of assembling the battery, which contributes to the solidity and security of the mass of cylinders. When the nuts are tightened the plates flex a little locally to make up for any slight difference in the length of the cylinders, with the result that the connections at the ends of the numerous cylinders are perfectly firm and do not tend to loosen even after extended service over rough roadways.

The front end necks have extension fittings 28 provided with safety release devices 29 of a known kind, and the rear end necks have extension fittings 30, also provided with safety devices 31. Each cylinder is also provided with an individual valve 33 in its fitting 30, as shown in Fig. 3. For simplicity of illustration these valves are not shown in Figs. 4 and 8. The extension fitting 28ᵃ of the front neck of one of the cylinders near the center of the nest has a provision 32 to receive a thermo-couple.

The cylinders lie in horizontal rows or layers. In this embodiment of the invention there may be five layers of cylinders, though the precise number may be varied. In conformity with the disposition of the openings 12 in the end plates 9 and 10, the cylinders are staggered in the vertical direction, so that the axes of the cylinders in each layer are midway between the vertical planes of the axes of the cylinders of the layers beneath and/or above. Thus, the layers are somewhat interfitting, and each cylinder above the bottom row rests with its entire weight on two cylinders beneath. The cylinders of the bottom layer rest on the underlying vehicular support, to which the weight of the whole nest of cylinders is applied. In the construction illustrated, the bottom cylinders lie on the cross-beams 8 of the vehicle frame, or on plates 34 of copper or other suitable material placed on the tops of these beams to protect the cylinders from abrasion. Because of the friction between the bottom cylinders and the underlying support and between the cylinders of the different layers, resisting any displacement of the nest of cylinders as a whole or of individual cylinders, the problem of restraining the cylinders against the effect of inertia of movement, or rest, is greatly simplified, and holding means which is very light in relation to the mass of charged cylinders may be employed. The simple fastenings 26, 27 on the necks, the light end plates and the light structure that braces and holds these plates in place on the vehicle have proved to be entirely adequate. The fastening nuts are also sufficient to prevent movement of the cylinders laterally, upward, or about their axes. In each layer, the cylinders are close together, though their sides need not actually touch each other. It is not necessary that the outside cylinders touch the sides of the box frame.

At the rear end of the nest or battery of gas cylinders is the manifold and outlet system, through which the cylinders deliver their gas and through which they are charged, the cylinders being charged or discharged as a battery, or by sections of the battery. Three transverse manifolds 35, 36 and 37 are shown, these manifolds being supported, independently of the cylinders, by brackets 38 projecting rearward from the plate 10. The extensions 30 of the rear end necks 22 of the top layer of cylinders are connected with the top manifold 35 by flexible tubing or "pigtails" 39. The cylinders of the second and third layers from the top are connected in a similar manner with the manifold 36, and the cylinders of the bottom layer and the layer next above it are similarly connected with the manifold 37. With the staggered and nested relationship of the cylinders of the different layers, a compact and generally advantageous organization of the manifold system, with the flexible "pigtail" connections of contiguous layers of cylinders interjacent as shown, is made possible.

Behind the lower portion of the plate 10 there is a common header pipe 41. The manifolds 35, 36 and 37 are connected with this header by pipes 42, 43 and 44, which may be considered to be parts of the manifolds. Provision is made for selectively establishing and shutting off communication between the gas cylinders, in groups, and an outlet and charging extension 45, 46 of the header pipe 41. Thus, valves 47 and 48 in the header pipe 41, at opposite sides of said outlet and charging extension, can be operated to shut off or open the communication between this extension and the manifolds 35 and 36, respectively, and the cylinders served thereby, and a valve 49 in the pipe 44 will similarly cut off or open communication in respect to the manifold 37 and its cylinders.

The rearwardly extending portion 45 of the outlet and charging connection is provided with means 50 for the insertion of a thermo-couple. The lateral branch 46 is adapted to receive a connection to the service piping of the customer's plant, or the filling piping of the charging plant. At other times, it is protected by a cap 51. A master shut-off valve 52 is provided in this terminal branch 46.

The manifold and delivery and charging piping is enclosed in a box 53 secured to the plate 10 and the vehicle frame, this box having a door 54 for access to the outlet and charging terminal. Another housing 55 encloses the front necks of the cylinders and their safety devices.

It will be understood that the invention may be embodied in other forms and that numerous changes may be made in details.

I claim:

1. A vehicular compressed gas cylinder battery comprising numerous cylinders capable of withstanding high internal pressure and having an underlying support for the cylinders, the cylinders of said battery being disposed lengthwise of the vehicle in layers, the cylinders of the bottom layer resting upon the underlying support and the cylinders of other layers resting upon the cylinders beneath, whereby the weight of the gas cylinders and the consequent friction between them and the under support resists projectile action, a manifold system at one end of the vehicle, through which to charge and discharge the cylinders, said manifold system comprising a plurality of manifold elements supported independently of the cylinders and flexible connections between said manifold elements and different groups of cylinders, and means for holding the cylinders of the battery, in solid mass against displacement.

2. A vehicular compressed gas cylinder battery comprising numerous cylinders capable of withstanding high internal pressure and having an underlying support for the cylinders, the cylinders of said battery being disposed lengthwise of the vehicle in layers, the cylinders of each layer being staggered with respect to the cylinders of the adjacent layer or layers, so that the layers of gas cylinders are nested, the cylinders of the bottom layer resting upon the underlying support and each of the cylinders of other layers resting upon two cylinders beneath, a manifold system at one end of the vehicle, through which to charge and discharge the cylinders, said manifold system comprising a plurality of manifold elements supported independently of the cylinders and flexible connections between said manifold elements and different groups of cylinders, and means for holding the cylinders of the battery, in solid mass, against displacement.

3. A vehicular compressed gas cylinder battery having an underlying support for the cylinders, the cylinders of said battery being disposed lengthwise of the vehicle in layers, the cylinders of the bottom layer resting upon the underlying support and the cylinders of other layers resting upon the cylinders beneath, whereby the weight of the gas cylinders and the contact between them and the under support resists projectile action, a manifold system at one end of the vehicle, through which to charge and discharge the cylinders, and means for holding the cylinders of the battery against displacement, said means comprising vertical end retainer plates having openings, necks on both ends of the cylinders passing with free clearance through said openings, and fastening devices on said necks and tightened against the faces of said plates, said manifold system being connected with the necks projecting through one of said retainer plates.

4. A vehicular compressed gas cylinder battery comprising a nest of gas cylinders disposed lengthwise of the vehicle in layers, the cylinders of each layer being staggered with respect to the adjacent layer or layers, each cylinder of each layer above the bottom layer resting upon two cylinders, screw-threaded necks on both ends of the cylinders, vertical end retainers having openings through which said necks pass with free clearance, nuts on said necks and bearing against said retainers, and a manifold system connected to the necks at one end of the nest of cylinders and outside the vertical retainer.

5. A vehicular cylinder battery for commercial distribution of compressed gas, comprising many lengthy gas cylinders disposed lengthwise of the vehicle in a layered mass, a manifold system at one end of the battery for charging and discharging the cylinders, the cylinders having necks at their ends, a braced retaining structure including elastic end parts having openings for said necks of such dimensions that the gravitational load of the cylinders is applied from layer to layer to an underlying support on the vehicle, and elements coacting with the necks of the cylinders and stressing said elastic parts to preserve solidity of the mass.

6. A vehicle cylinder battery for commercial distribution of compressed gas, comprising many lengthy gas cylinders disposed lengthwise of the vehicle in a layered mass, with each cylinder of a layer in contact with and supported and laterally restrained by two cylinders of the layer beneath, a manifold system at one end of the battery for charging and discharging the cylinders, necks at both ends of the cylinders, a braced retaining structure having elastic end parts with openings through which the necks project free of vertical support in the openings, and means coacting with the necked cylinders and tightened upon the elastic end parts so as to hold the battery in permanently solid assembly.

7. A vehicular cylinder battery comprising a layered mass of cylinders provided with necks at both ends, a manifold system at one end of the battery for charging and discharging the cylinders, plates apertured for said necks with openings of such size that the plates do not support the cylinders against gravity but the cylinders rest upon each other and upon an underlying support on the vehicle, spacers interposed between the plates and the shoulders of the cylinders, and fastenings coacting with the necks and tightened against the outer surfaces of said plates.

8. A vehicular compressed gas cylinder battery having an underlying support for the cylinders, said battery comprising a plurality of cylinders disposed lengthwise of the vehicle in solid mass in which any upper cylinder rests on two underlying cylinders and the bottom cylinders rest on the underlying support, and means for holding the cylinders of the battery against displacement, said means comprising end retaining members having openings, necks on both ends of the cylinders passing with free clearance through said openings, and fastening devices on said necks and tightened against said retaining members, the end retaining members being free of the weight of the cylinders.

9. A vehicular compressed gas cylinder battery having an underlying support for the cylinders, said battery comprising a plurality of cylinders disposed lengthwise of the vehicle and provided with necks at both ends, end retainers apertured for said necks with openings of such size that the end retainers do not support the cylinders against gravity but the cylinders rest in solid mass upon each other and upon the underlying support, elements surrounding said necks and in contact with the inner sides of said end retainers, and other elements on the outer portions of the necks and bearing against the outer sides of said retainers, whereby the cylinders are secured against displacement.

EUGÈNE L. RAGONNET.